June 1, 1937.  W. MOE  2,082,647
LAWN MOWER
Filed Aug. 3, 1936  2 Sheets-Sheet 1

INVENTOR
William Moe
BY
C. M. Newman
ATTORNEY

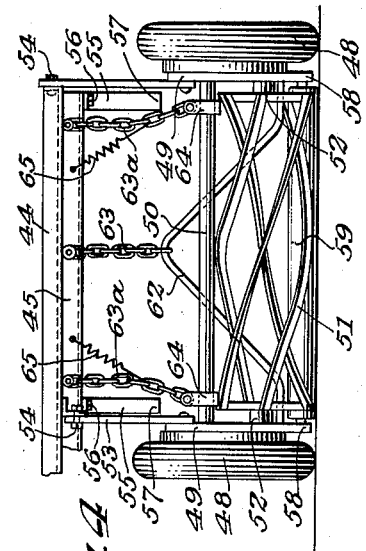
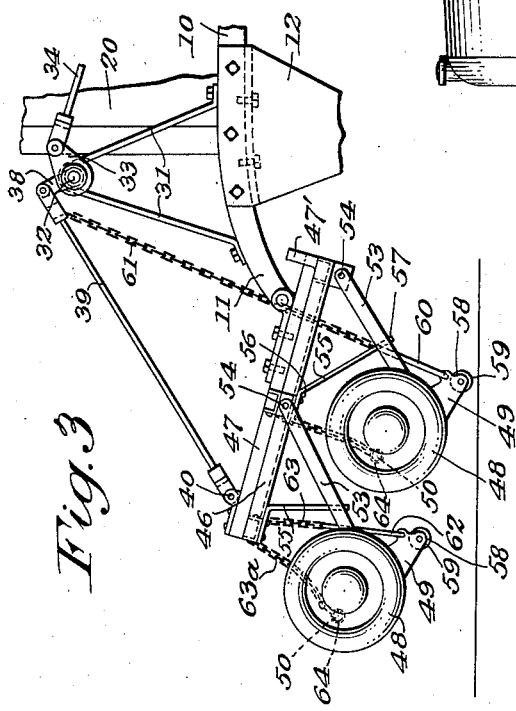
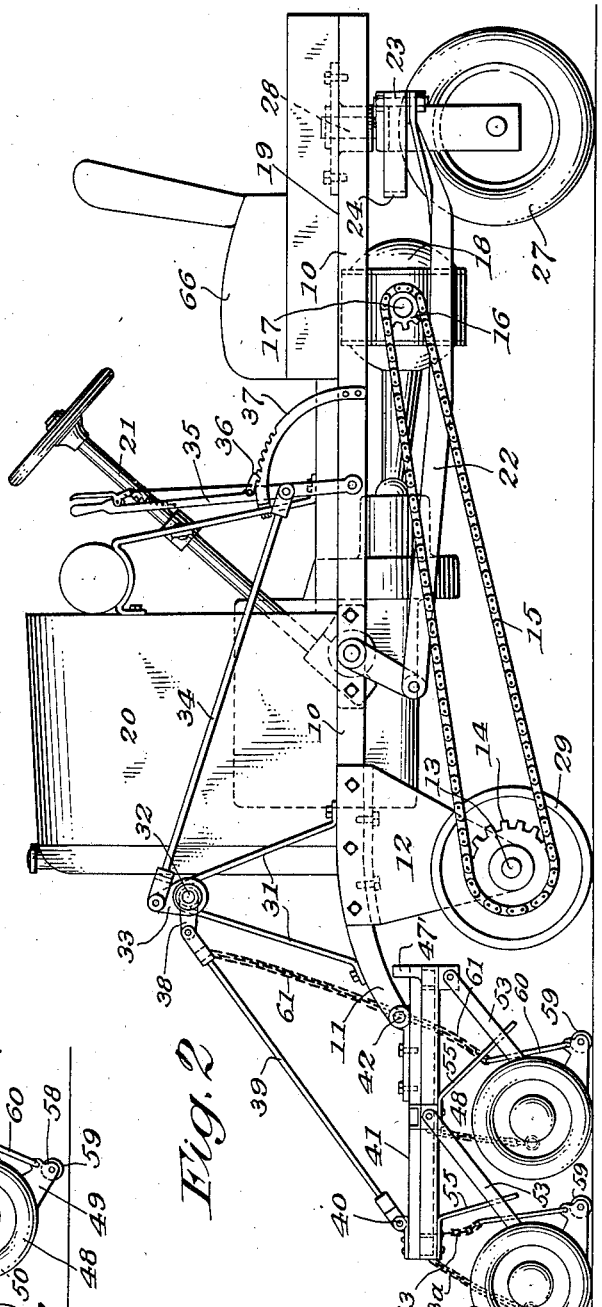

Patented June 1, 1937

2,082,647

UNITED STATES PATENT OFFICE 2,082,647

LAWN MOWER

William Moe, Milford, Conn.

Application August 3, 1936, Serial No. 93,999

3 Claims. (Cl. 56—7)

My invention relates to new and useful improvements in power operated lawn mower and refers more particularly to the class of mowing machines which are used for mowing lawns, golf courses, parks and other tracts where it is desired to keep the grass trimmed short and evenly and the ground smoothly rolled.

An object of the invention is to provide a mowing machine which includes separate mower units that are carried by a suitable frame which is hung from the forward end of a tractor, in close relation thereto and adapted to be propelled thereby and operated by the operator of the tractor.

A special object of the invention is to construct a mowing unit that can be attached to the forward end of a tractor in compact relation and whereby the mower can be more evenly and accurately steered, as between bushes, trees, posts or the like, through connections with the rear wheel or wheels.

The machine is preferably driven through a chain drive from the jack shaft, to the driving shaft of the tractor and to employ driving wheels upon the drive shaft which have exceptionally wide treads and wherein the combined width of the treads equal that of the width of the tractor and thus form a roller for the lawn which immediately follows the gang of mower units and is positioned immediately beneath the motor of the tractor so that the majority of the weight of the tractor is supported upon the rollers.

The machine as designed and by reason of its rear steering wheels can be turned around in a limited space with all the mowing units in cutting operation.

The machine includes two aligned series of lawn mower units which may be somewhat like commercial types of mowers and supported from a special design of frame that is hung from the tractor.

The mowing units are arranged in staggering relation so that no part of the lawn is skipped either while traveling straight away or in turning, each machine taking care of its proper area and cutting in lapping relation as is customary with hand mowing.

Other objects of the invention reside in the novel arrangement of parts and details of construction hereinafter described and wherein Fig. 1 shows a top plan view of a complete power lawn mowing machine embodying my invention and applied to a suitable form of tractor;

Fig. 2 shows a side view of the mower and tractor shown in Fig. 1;

Fig. 3 shows a further side view of the lawn mowing unit attached to the forward end of the tractor as shown in Fig. 2, but in a raised position, and Fig. 4 shows an enlarged view of one of the individual lawn mower units comprising the group of mowers as shown in Fig. 1.

Figure 1:
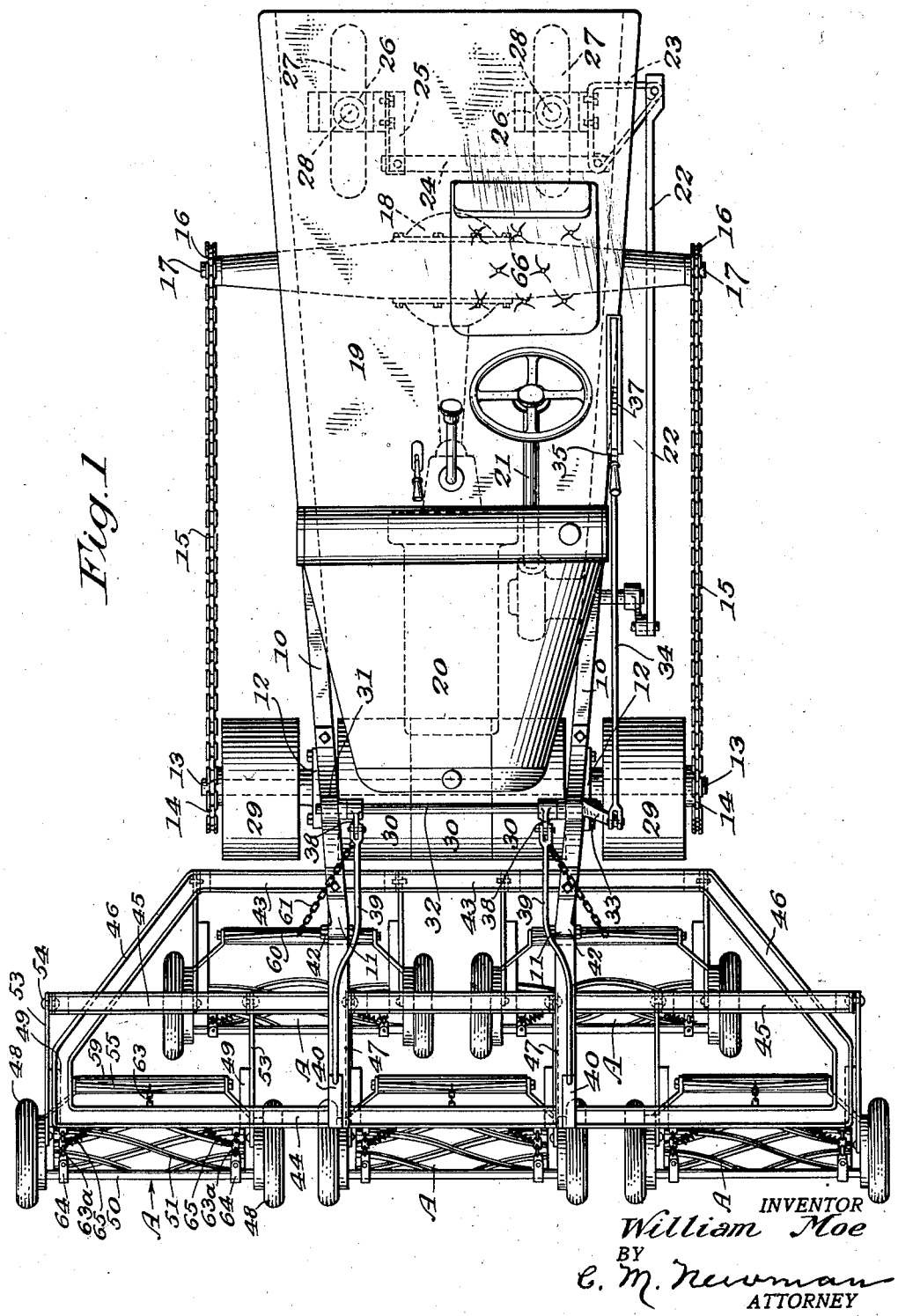

Referring in detail to the characters of reference marked upon the drawings and more particularly to the tractor illustrated therein, 10 represents the chassis frame, 11 the two forward end portions or horns, 12 indicate hangers depending from the forward end portion of the machine and including bearings in which the driving axle 13 is journaled. Sprocket wheels 14 are mounted on the end portions of the drive shaft and are connected by a sprocket chain 15 with a smaller sprocket 16 on opposite end portions of the drive shaft 17 journaled in the housing 18 secured to the frame and bed 19 of the machine. This drive shaft is geared to be driven by a motor inclosed under the hood 20 in somewhat the customary manner.

21 represents a steering post that is connected through a link 22 with a bracket 23, link 24 and arm 25 whereby bearings 26—26 for the rear wheels 27 are turned upon their pivots 28 for steering the machine. The driving shaft 13 is provided with end tractor wheels 29—29 and intermediate tractor wheels 30—30—30 which are closely associated on the shaft to form a roller that closely follows the cutting units and serves to leave the ground smooth. These tractor wheels are mounted upon the shaft 13 to insure proper application of power and free turning of the machine.

I provide a support 31 upon each side portion of the front end portion of the chassis to form bearings for a rocker shaft 32. The rear end of the rocker shaft as seen in Figs. 1 and 2 is provided wtih an arm 33 that is connected by a link 34 with an operating lever 35 that is provided with a spring actuated pawl 36 that engages a rack 37, the object, of course, being to operate the rocker shaft through the said lever. A pair of additional arms 38 are also secured to this rocker shaft 32 and to which is connected a rod 39 the forward end of which is hingedly connected as at 40 to the forward end of a frame 41 that supports the mower units. The rear end portion of this frame is hingedly connected as at 42—42 to the end of the horn 11 of the chassis frame so that when the handle is operated to raise the mower frame the latter swings upward upon its pivot 42.

The mower frame, see Figs. 1 and 2, is preferably formed of channel iron and includes three relatively long cross members 43, 44 and 45, the first two mentioned members being connected by end portions 46 while the middle member 45 and the intermediate connecting member 47 are secured to the top side of the cross members as by means of welding. The frame is thus constructed to form a relatively wide structure that extends out beyond the sides of the tractor to support the several mower units and will be sufficiently rigid and durable so that the five mower units A carried thereby can be raised from the ground as shown in Fig. 3 for the purpose of traveling over the road, curbs or uneven surfaces.

From Figs. 2 and 3 it will be seen that the two intermediate members 47 of the mower frame are provided with upturned ends 47' that are in line with the underside of each of the horns 11 and are designed to contact therewith better to steady the position of the frame and the mowers attached thereto in case the mowers pass over a marked depression or gutter.

The mower units A are of modern design and include rubber tired wheels 48, wheel supporting plates 49, and a rod 50 which connects said plates. 51 indicates the cutting knives which are journaled at 52 in the plates and are driven through a form of pawl and ratchet mechanism, not shown, within the wheels. Push bars 53 have one end connected to the frame as at 54 and the other end to the plate 49 whereby the mowers are shoved forward by the frame. A guide stem 55 that is secured to the underside of the frame at 56 has its lower end portion 57 disposed in relative close relation to the push bars so as to permit of limited sidewise movement of the mower units as in turning the machine. The rearwardly disposed end portions 58 of the wheel plates 49 of the mower units, which carries the small roller 59 is connected by a yoke 60 and a chain 61 with the before mentioned link 39 so as to properly support this portion of the mowers and to keep the latter on a relatively even keel when the mowing units are raised. This reference as will be seen applies to the two rear mowers while the three front mowers are provided with a somewhat similar yoke 62 and chain 63 for supporting the rear portion of the front mowers when raised, from the underside of the unit frame. Each of said mowers is also provided with two additional chains 63a one end of which is connected to the frame and the other to a clip 64 secured to the rod 50 so as to limit the tilting movement of the mowers when they are raised. A small spring 65 has one end secured to the underside of the frame and the other to one of these chains so as to take up the slack in the same when the mowers are lowered as for cutting operations, the purpose being to support the chains up out of possible contact with the knives of the mowing unit when the mowers are in operation.

Referring again to Figs. 1 and 2 where the gang of mowers are lowered into an operative position it will be seen that the same are supported on their own wheels and that the said mower units are more or less flexibly connected so that the cutting knives of the several units are free to be self propelled by the rotation of the mower wheels 48 and that due to the staggered relation of the mowers as assembled beneath the frame they cut a clean swath wider than the machine. The frame and its three units are freely shoved along forward of the tractor through its hinge connection 42 therewith, and is only supported and carried thereby, see Fig. 3 when the mower units are raised, said raising lowering operation being performed by an operator positioned on the seat 66 of the tractor.

Having thus described my invention what I claim and desire to secure by Letters Patent is:

1. The combination with a tractor including a chassis frame, of bearing supports upon the forward part of the frame, a rocker shaft journaled in said supports and extending across the front of the tractor, manual means for operating the rocker shaft, a mower carrying frame hingedly connected to the front end of the chassis frame, two rows of individual mowers connected beneath the frame in alternate relation, connections between the rocker shaft and the forward end of the frame whereby the same and its mowers may be raised by the operation of the rocker shaft, push bars connecting the mowers with the frame, guide means secured to and depending from the frame to engage the push bars to flexibly guide the mowers, connections from the frame to the front of each mower, additional connections from the frame to the rear of each mower and from the frame to rearwardly extended portions of the mower frame carrying the ground engaging rollers to insure the raising of the rear portion of the mower units from the ground with the raising of the frame.

2. The combination with a tractor including a chassis frame, of bearing supports upon the forward end of the chassis frame, a rocker shaft journaled in said supports and extending across the front of the tractor, manual means connected with the rocker shaft to operate the same, a mower supporting frame hingedly connected to the front end of the chassis frame, a rod connecting the rocker shaft and the forward end of the mower supporting frame whereby the mower frame and its mowers may be raised, two rows of individual lawn mowers supported from and beneath the frame including ground engaging rollers, the mowers in one row being alternately arranged with respect to those in the adjacent row, push bars connecting the mowers with the frame, guide means secured to and depending from the mower supporting frame to engage said push bars to flexibly guide the mowers, means connecting the forward part of the mowers with the mower supporting frame, a flexible yoke the opposite ends of which are connected to opposite rear side portions of each mower frame, means connecting the yokes of some of said mowers to the forward portion of the mower supporting frame and means connecting other of the yokes to the rod, whereby with the operation of the rocker shaft and rod the rear portion of the mowers including the ground engaging roller will be raised with the raising of the frame.

3. The combination with a tractor frame, of a mower supporting frame hingedly connected to the front thereof and comprising a series of transverse, intermediate and end connecting members, means for raising and lowering the mower supporting frame upon its hinged connection, two series of mower units one behind the other and alternately arranged below and supported by the supporting frame, ground engaging rollers mounted in the rear portion of each of said mower frames, a push rod connecting each end portion of each mower with the supporting frame, chain connections from the supporting frame to the front and rear sides of each mower, the said rear chains being so proportioned and connected as to insure the raising of the rear portions of the mowers and their ground engaging rollers clear of the ground when the mower supporting frame is elevated.

WILLIAM MOE.